PROCESSING OF COMMUNICATIONS SIGNALS TO REDUCE EFFECTS OF NOISE

Filed May 28, 1965 2 Sheets-Sheet 1

INVENTOR
M. R. SCHROEDER
BY C. E. Hirsch Jr.
ATTORNEY

Sept. 24, 1968 M. R. SCHROEDER 3,403,224

PROCESSING OF COMMUNICATIONS SIGNALS TO REDUCE EFFECTS OF NOISE

Filed May 28, 1965 2 Sheets-Sheet 2

United States Patent Office 3,403,224

Patented Sept. 24, 1968

3,403,224

PROCESSING OF COMMUNICATIONS SIGNALS TO REDUCE EFFECTS OF NOISE

Manfred R. Schroeder, Gillette, N.J., assignor to Bell Telephone Laboratories, Incorporated, New York, N.Y., a corporation of New York Filed May 28, 1965, Ser. No. 459,655
11 Claims. (Cl. 179—1)

ABSTRACT OF THE DISCLOSURE

To improve quality of a communications signal, noise components which accompany the signal are removed by analyzing a signal to obtain a measure of the energy in each of a number of frequency sub-bands, by developing a signal representative of the average contribution of noise to the signal in each sub-band, and by selectively subtracting the noise representative signals from the sub-band signals.

Figure 1:
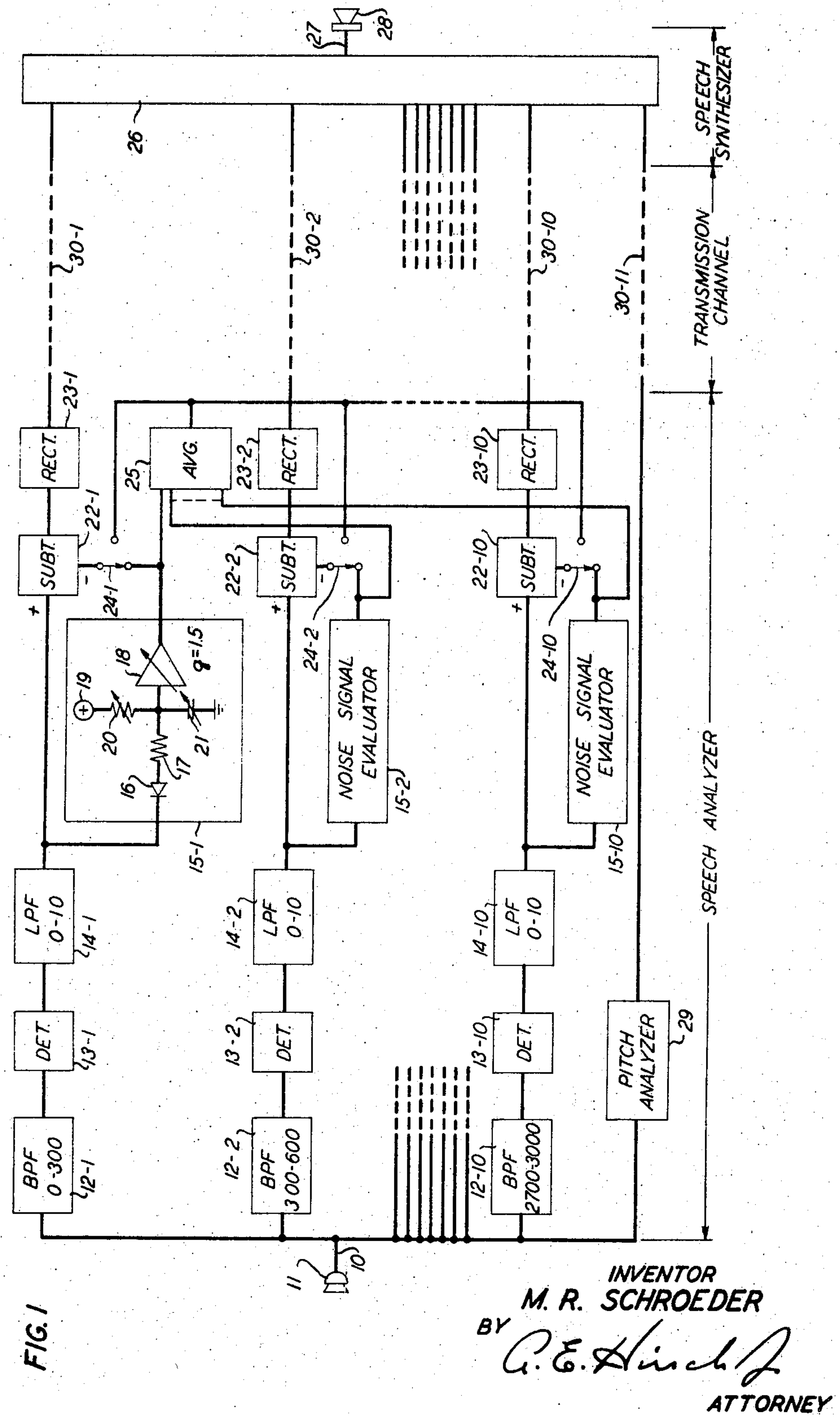

This invention relates to the processing of communications signals impaired by noise components and, more particularly, to the method of and apparatus for eliminating audible noise from a communications signal. It has for its principal object, an improvement in the quality of the signal through the elimination of the noise contribution to the signal.

A variety of different techniques have been employed in the past to cleanse a communications signal, e.g., a speech signal, of accompanying noise components. Thus, noise may be "stripped" from the envelope of a speech signal by clipping, squelching, gating, or by a combination of these operations. Such techniques are quite effective for impulse noise and the like which "rides" the signal envelope, but are not altogether successful in eliminating other continuous noise such as quantizing noise, thermal noise, or the like. A somewhat more satisfactory approach to the problem of reducing the impairment of a signal by noise, involves the suppression of spurious frequency components in the interharmonic regions of the "fine" structure of the spectrum of the signal, relative to harmonic components. Such a system is described in M. R. Schroeder, Patent 3,180,936, granted Apr. 27, 1965. This system recognizes that continuous noise is distributed throughout the spectrum of a signal and is relatively immune to ordinary processing.

The present invention approaches the problem from a somewhat different though related avenue, and relies, at least in part, on the ability of the ear to mask low energy signals which occur with or near a large energy signal such as a formant, but to respond to the same low energy signals when they occur at or near relatively low energy signal components, such as those between formants. Accordingly, the average contribution of noise to each of a number of channel spectrum signals, developed for contiguous frequency sub-bands of a communications signal, is, in accordance with the invention, subtracted from each of the channel signals. During periods of high energy in each channel, the subtraction of the average value has little effect on the quality or intelligibility of the speech. During periods of low energy in any one of the sub-band signals, when the noise contribution is most easily perceived, the subtraction effectively removes the noise contribution so that a cleaner signal is passed on to the output of the channel.

In the event that the contribution of noise is predictable, for example, is due to certain kinds of random fading or the like, the appropriate average contribution to be subtracted from the signal is easily determined. However, in most situations the noise contribution is unpredictable and thus must be continuously determined for each channel of the system. It has been found through experience that this determination may be made satisfactorily by examining the variations of speech energy in each sub-band. In particular, the contribution of noise to the level of each of a number of channel signals which define the voice energy level in each sub-band may be estimated from the relative minima that the channel signals reach during time intervals that comprise at least several speech sounds or during a silent interval. It is assumed that noise, even though of an unpredictable nature, is reasonably stationary over several speech sounds, or generally, for one or two seconds. Accordingly, a signal proportional to the average contribution of noise to each channel signal is developed during periods of low speech signal energy, preferably during silent speech intervals, and is averaged over an interval of approximately one or two seconds. The averaged noise signals are then subtracted individually or in selected combinations from the channel signals. It is not always possible to estimate the noise contribution to a particular channel accurately, i.e., during intervals of high speech energy. This is primarily because of the finite averaging time in the spectrum analyzer, i.e., the development of the channel signals. The estimate will at times, therefore, be too high and at other times will be too low. Some spectral distortion may thus result. However, on the average, the distorting is slight and may not occur in all channels at once. Experience has shown, moreover, that the slight distortion which occasionally is produced is exchanged for an appreciable improvement in speech quality; the noise level is considerably reduced with virtually no deterioration of intelligibility. Subjectively, the exchange is most desirable.

The principles of the invention may be turned to account in a number of ways. Essentially, a signal is divided, on the frequency scale, into a plurality of sub-bands, and the speech energy in each sub-band, or channel, is measured. A number of frequency domain systems, generally referred to as a vocoder analyzers, or the like, may be used for this purpose. The contribution of noise to each channel may similarly be established in a number of ways. If the channel signal is characterized by periodic silent intervals, ordinary noise measuring techniques may be used. If the spectrum of the noise is known, only its overall intensity need be measured. For unpredictable noise in relatively continuous speech energy signals, an average value is estimated on the basis of minimum channel signal excursions, together with a maximum expected noise signal level.

After subtraction, the modified channel signals are used to reconstitute the applied signal, for example, using conventional vocoder synthesizer apparatus. A pitch defining signal, derived from the input signal, is generally employed to control the synthesis. As required, the synthesis operation may take place at any physical location. Thus, the synthesizer may be located at a distant reception location.

It is apparent that the operation of a vocoder communications system employed, for example, for narrow band signaling between distant locations, may be appreciably enhanced through the use of the present invention. The contribution of noise to each control channel of such a system may be individually reduced. This is particularly desirable since the control channels of such a system contribute to the output noise of the system. Extremely low-noise pitch analyzer circuits are known, for example, the one described in a copending application of A. M. Noll and M. R. Schroeder, Ser. No. 420,362, filed Dec. 22, 1964, but a low-noise pitch circuit is of limited value in lowering the noise level of the synthesized speed signal if the channel control signals are themselves noisy. By thus employing a low-noise pitch circuit, and reducing the noise of the individual energy control signals, the overall noise of the system may be reduced to a very low level.

Figure 2:
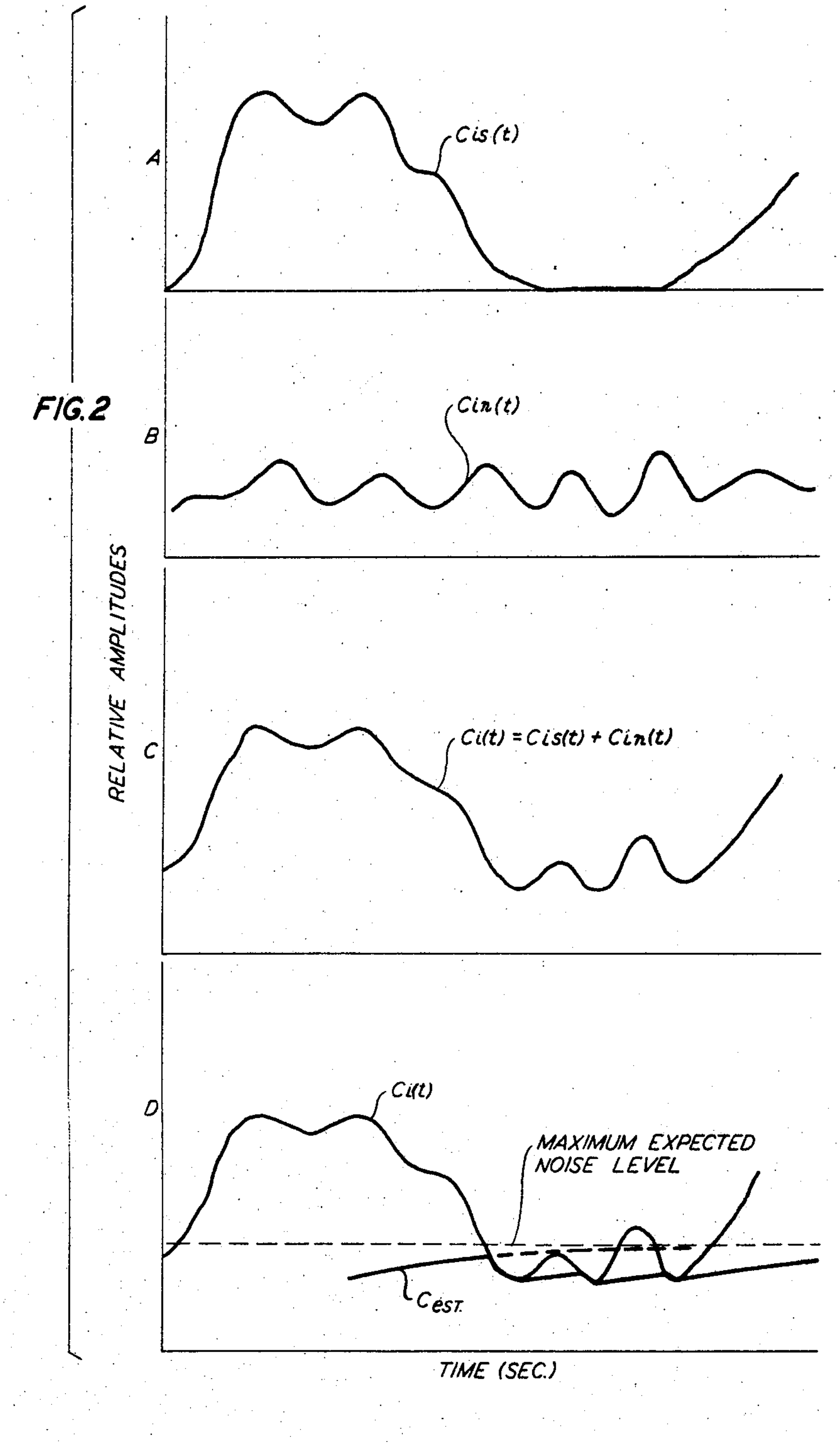

The invention will be more fully understood from the following detailed description of illustrative embodiments thereof taken in connection with the appended drawings, in which:

FIG. 1 is a schematic block diagram of a speech transmission system which embodies the present invention; and FIG. 2 is a set of curves which are referred to in the explanation of the invention which follows.

Communications signals, for example speech signals, are supplied to the speech transmission system of FIG. 1 by way of speech circuit 10. As indicated, these signals may originate in a telephone instrument or microphone 11. The signals are delivered to spectrum analyzer apparatus by which the frequency spectrum of the signal is subdivided into contiguous segments. Any analyzer that produces speech control signals representing the short time spectrum or a similar description of a speech signal, may be used. One suitable one, conventionally used in so-called channel vocoder systems, is shown in the figure. Signals from circuit 10 are supplied in parallel, to each one of a bank of bandpass filters 12, each of which is proportioned to pass a preassigned, sub-band of the voice frequency band of interest, and which together pass the entire band. For sake of illustration, ten such filters, each with a 300 cycles per second pass band are indicated, the first two and the last one only being shown. Each filter 12 is followed by a detector 13 and, in turn, by a low pass filter 14. The control current output of each of the several low pass filters 14 is thus a measure of the voice energy in that sub-band to which such low pass filter is connected.

Since each of bandpass filters 12 passes one segment of the band only, for example, a 0–300 cycles per second segment of a 0–3000 cycles per second band, it is apparent that each of the energy control signals will generally differ from all others, in dependence on the character of the input signal. Since frequency averaging is helpful in eliminating noise, it is desirable to employ relatively wide band channel filters. Concomitantly, time averaging is also an aid in reducing the effects of noise. Accordingly, it is desirable to employ relatively narrow band control signal filters. Filters 14 thus typically pass a band of frequencies in the range of 0–10 cycles per second.

FIG. 2A illustrates an ideal energy control signal devoid of noise. FIG. 2B illustrates a typical noise signal which may accompany a channel signal. Although the noise is relatively unpredictable, its average value is essentially constant, or is assumed to be constant at least over intervals of several seconds duration. The effect of such a noise signal on the channel signal is illustrated in the diagram of FIG. 2C. A signal of this sort is, during noisy signal conditions, delivered at the output of each one of filters 14. It is apparent that the noise-free channel signal of FIG. 2A has been increased throughout by the amplitude of the noise signal contribution. The noise fluctuations themselves are effective, however, to alter the overall character of the control signal, primarily during intervals of low control signal energy. This nonuniform contribution results from the masking faculty discussed above.

Designating the channel $i$ control signal as $C_{is}(t)$, and the noise contribution to channel $i$ as $C_{in}(t)$, the resulting composite signal (FIG. 2C) may be defined as:

$$C_i(t) = C_{is}(t) + C_{in}(t) \qquad (1)$$

During silent intervals, or intervals during which the speech energy level in a channel is low, a reasonably good evaluation of the noise component may be obtained, i.e., its average amplitude may be measured. In accordance with the invention, such an average value is subtracted from the channel signal so long as the channel signal is greater than the average noise level. Since only the average noise contribution is subtracted, the individual noise fluctuations are apparently still present in the channel signal.

The average noise contribution for each channel is preferably evaluated, in accordance with the invention, from the relative minima that the different channel signals exhibit during the course of several speech sounds. The evaluation is subject to the restriction that only the minima below an expected maximum noise level are examined. It is recognized that the actual noise contribution will be under-estimated, since minima are used for the estimate. Hence, in order to get a more accurate estimate, the running estimate is increased by a factor, greater than one, which represents the ratio $r$ of the average noise contribution and a typical minimum noise contribution. This factor may typically range from one to three; a factor $r$ of 1.5 has been found to be satisfactory.

FIG. 2D illustrates the method. An expected maximum noise level is indicated; it is established on the basis of experience with the system. Whenever the channel signal $C_i(t)$, falls below the running estimated noise level $C_{est.}$, the value of $C_{est.}$ is changed in accordance with the extent of the channel signal excursion below the running level. $C_{est.}$ follows $C_i(t)$ toward each minimum; it tends toward the maximum expected level between signal minima, but is carried back to each minimum encountered. It is never allowed to exceed the maximum expected noise level.

In practice, these operations are carried out in each channel by noise signal evaluator 15. Control signals issuing from filter 14, whose amplitudes are less than the maximum expected noise level of the system, are passed by way of a gate, such as biased diode 16 and resistor 17, to adjustable gain amplifier 18. Diode 16 is biased, in the absence of a channel signal, to the maximum expected noise level by a positive potential supplied from source 19 by way of adjustable resistor 20. Adjustable capacitor 21, shunting the input of amplifier 18, evidently is normally (absence of channel signal) charged to the bias level, i.e., the maximum expected noise level. The time constant of the system should be on the order of several seconds with resistor 17 being selected to have a relatively low resistance, so that capacitor 21 may be discharged quickly when diode 16 conducts.

So long as the control signal $C_i(t)$ exceeds the running estimated noise level, diode 16 is held in its cut-off condition and, with suitable adjustment of the operating level of amplifier 18, no net signal is developed at the output of evaluator 15. In this condition, control signals from filter 14 are unaffected as they pass through subtractor 22 and rectifier 23.

If the control signal level falls below the running estimate of noise level, the cathode of diode 16 becomes negative as compared with its anode, the diode conducts, and the anode voltage tends to follow the cathode voltage. Capacitor 21 thereupon discharges through the diode to the actual signal level and follows it so long as it continues to decrease. As soon as the signal increases, the capacitor begins to charge, but at a rate determined by the time constant of the circuit. It continues to do so until either the control signal once again drops below the capacitor potential or until the capacitor is once again charged essentially to the maximum expected noise level.

FIG. 2D illustrates the manner in which the running estimated noise level, namely, the charge $C_{est.}$ on capacitor 21, follows the negative-going control signals (those which occur below the maximum expected noise level), and eventually charge toward the noise level. It is apparent that the charge on the capacitor tends to follow, on the average, the control signal minima. By suitably selecting the time constant of network 15, a relatively constant potential $C_{avg.}$ may be produced.

The evaluation of noise contribution to the channel is completed by suitably increasing the level of the running estimate $C_{est.}$ by the factor $r$. In practice, the signal level is increased by a factor of $r=1.5$ in amplifier 18. The resulting nearly constant voltage closely approximates the average noise contribution to the control signal due to embedded noise.

In accordance with the invention, this signal is supplied to the negative input of subtractor 22 in which unit it is subtracted from the composite control signal applied to the input terminal of the subtractor from filter 14. The resulting modified signal may be designated $\widehat{C_i}(t)$, where $$\widehat{C_i}(t)=C_i(t)-C_{est.}(t)\cdot r \quad (2)$$

It constitutes a speech energy signal virtually undegraded by noise.

If the noise spectrum changes relatively slowly with frequency, noise estimates for adjacent channels are similar. In such cases, it has been found advantageous to average selectively estimates from adjacent channels. It is therefore in accordance with the invention to utilize the average noise levels estimated individually for all channels together to form, when desired, an averaged signal representative of the noise level in all of the channels. Such a signal is subtracted from each channel signal after suitable weighting for different channels, as required. The required average may be formed by applying the individual average noise signals developed by evaluators 15 to an averaging network 25, for example, a resistive matrix. Several such networks may be employed; only one is shown. It is assumed that averaging network 25 contains effective means, such as a plurality of channel amplifiers, for isolating the evaluators. The averaged signal developed by network 25 is made available to one pole of switch 24 connected between evaluator 15 and subtractor 22. Ordinarily, switch 24 is thrown to the pole connected to evaluator 15. However, in dependence on the signal being processed, one, two or all of the switches may be positioned to select the averaged signal for delivery to subtractor 22.

In the event that the average noise signal developed by evaluator 15 is greater than the momentary composite channel signal, as a result of the averaging process, for example, it is necessary to limit the channel signal output to zero since channel control signals may never be negative. Any form of decision network may be used for this purpose. One extremely simple one employs a rectifier 23 connected in the output of subtractor 22 biased to pass only positive signals. Thus, if the modified channel signal falls to zero or momentarily falls below zero, the output of the channel is zero, i.e., no signal is passed by rectifier 23.

Modified control signals developed in each channel of the system are then used to develop, in a speech synthesizer 26, a replica of the signals applied to the system by way of speech circuit 10. The reconstituted signals are delivered by way of circuit 27 to their ultimate destination, for example, to loudspeaker 28.

Any form of speech synthesizer may be used; so-called vocoder synthesizers are entirely satisfactory. Typically, such a synthesizer requires, in addition to spectrum control signals, a relatively low noise indication of the momentary pitch of the signals. Accordingly, pitch analyzer 29 may be supplied with input signals from channel 10. It delivers to synthesizer 26 the necessary indication of the pitch of the applied signal. A suitable low noise pitch analyzer is described in the above-cited application of Noll and Schroeder.

Although it is often desirable to process speech signals or the like to remove embedded noise at one location only, it is also frequently desirable to remove noise from signals before transmission to a distant location or, after reception, to remove noise added during transmission. Accordingly, it will be understood that speech synthesizer 26 may be located either with the processing apparatus of the analyzer or at a distant location. That is to say, transmission channel 30 may be of any desired extent.

The above-described arrangements are, of course, merely illustrative of the application of the principles of the invention. Numerous other arrangements mya be devised by those skilled in the art without departing from the spirit and scope of the invention.

What is claimed is:

1. Signal processing apparatus which comprises, means for analyzing a message wave, means for deriving from said analysis a group of control signals each one of which is representative of the energy within a selected frequency band of said wave, means for evaluating the contribution of noise to each of said frequency bands, means responsive to said evaluations for developing for each of said bands a signal representative of the contribution of noise, and means for selectively subtracting said noise representative signals from said control signals.

2. Signal processing apparatus which comprises, means for analyzing a message wave, means for deriving from said analysis a group of control signals each one of which is representative of the energy within a selected frequency band of said wave, means for evaluating the contribution of noise to each of said frequency bands, said evaluating means including means for examining amplitude variations of said control signals, means responsive to said examinations for developing for each of said bands a slowly varying signal representative of amplitude variations during intervals of low energy, and means for subtracting said slowly varying signals from said control signals.

3. Apparatus for suppressing noise in a message signal which comprises, a source of a message signal, means for deriving from said message signal a plurality of control signals representative of the short time spectrum of said message signal, means for developing a signal representative of the contribution of noise to said control signals, and means for selectively subtracting said noise contribution signal from said control signals.

4. Apparatus for suppressing noise in a communications signal which comprises, a source of a communications signal, means for deriving from said signal a plurality of spectrum control signals representative of the energy falling within a plurality of frequency sub-bands of said communications signal, means for developing a group of average level signals representative of the contribution of noise to each of said control signals, and means for subtracting said average level signals from said control signals.

5. Apparatus for processing speech waves to remove relatively continuous noise which comprises, in combination with a source of a speech wave, means for analyzing a speech wave to produce a plurality of spectrum control signals, means for evaluating the contribution of noise to each of said spectrum control signals, means for developing in response to each evaluation a signal representative of the noise contribution to the respective spectrum control signal, means for selectively subtracting said noise representative signals from said spectrum control signals, and means for delivering the difference signal resulting from said subtraction to an output circuit.

6. Apparatus as defined in claim 5 wherein said means for evaluating the contribution of noise to each of said spectrum control signals comprises, means for gating spectrum control signals below a preselected low level to a relatively long time-constant storage network, and means for increasing the level of signals stored in said network by a preselected small factor greater than one.

7. In combination with means for developing a group of spectrum control signals representative of the speech energy falling within a plurality of frequency sub-bands which collectively embrace the frequency band of a speech signal, means for developing a group of signals representative respectively of the contribution of noise to each of said spectrum control signals, means for selectively averaging said noise representative signals, and means for selectively combining said averaged representative signals algebraically with said spectrum control signals.

8. Apparatus for suppressing noise in a speech signal which comprises, a source of a speech signal, means for deriving from said speech signal a plurality of spectrum control signals representative of the speech energy falling within a plurality of frequency sub-bands which collectively embrace a selected frequency band of said speech signal, means responsive to minima in each of said spectrum control signals for developing a group of average level signals representative of the contribution of noise to each of said control signals, and means for subtracting said average level signals from said corresponding control signals.

9. Apparatus for suppressing noise in a speech signal which comprises, a source of a speech signal, means for deriving from said speech signal a plurality of spectrum control signals representative of the speech energy falling within a plurality of frequency sub-bands which collectively embrace the frequency band of said speech signal, means responsive to signal minima in each of said spectrum control signals for developing a group of average level signals representative of the contribution of noise to each of said control signals, means for selectively adjusting the magnitudes of said average level signals, means for selectively combining said adjusted average level signals, and means for subtracting said combined average level signal from selected ones of said control signals.

10. In a narrow band speech transmission system which comprises, in combination, means for deriving from an applied speech wave a plurality of spectrum control signals representative of the speech energy falling within a plurality of frequency sub-bands collectively embracing the frequency band of said speech wave, means for deriving from said speech wave a pitch control signal representative of the momentary pitch of said wave, and means responsive to said spectrum control signals and to said pitch control signal for reconstituting said speech wave; means for eliminating noise from each of said spectrum control signals which comprises, means for developing a group of signals representative respectively of the contribution of noise to each of said control signals, means for selectively averaging said noise representative signals, and means for selectively combining said noise representative signals algebraically with said control signals.

11. The method of eliminating noise from a message signal which includes the steps of: analyzing a message signal to develop a measure of the energy in each of a selected number of frequency sub-bands of the signal, developing a running estimate of the contribution of noise to each of said measures, changing each of said running estimates whenever the level of the corresponding measure of energy falls below a pre-established level, smoothing the changed running estimates, modifying the magnitudes of the smoothed running estimates by a selected factor, and selectively reducing the magnitudes of the individual measures of energy by the magnitudes of the modified running estimates.

References Cited

UNITED STATES PATENTS

| | | | |
|---|---|---|---|
| 1,968,460 | 7/1934 | Llewellyn | 179—78 |
| 3,238,457 | 3/1966 | Boymel et al. | 325—67 |
| 3,204,119 | 8/1965 | Gray | 328—163 |
| 3,180,936 | 4/1965 | Schroeder | 179—1.8 |

KATHLEEN H. CLAFFY, *Primary Examiner.*

R. P. TAYLOR, *Assistant Examiner.*